United States Patent [19]

Katagiri et al.

[11] Patent Number: 5,560,482
[45] Date of Patent: Oct. 1, 1996

[54] MAGNETIC TAPE CASSETTE-ACCOMMODATING CASE HAVING AN EASILY DEFORMABLE INDEX CARD

[75] Inventors: Shingo Katagiri; Teruo Ashikawa, both of Kanagawa, Japan

[73] Assignee: Fuji Photo Film Co., Ltd., Kanagawa, Japan

[21] Appl. No.: 416,005

[22] Filed: Apr. 4, 1995

[30] Foreign Application Priority Data

Apr. 8, 1994 [JP] Japan .................. 6-004897 U

[51] Int. Cl.⁶ ............................................. B65D 85/672
[52] U.S. Cl. ................ 206/387.1; 206/493; 206/387.13
[58] Field of Search ................ 206/387.1, 387.13, 206/493, 232, 312

[56] References Cited

U.S. PATENT DOCUMENTS

| 4,385,693 | 5/1983 | Gelardi et al. ............ 206/387.1 |
| 5,186,325 | 2/1993 | Sato et al. |
| 5,429,237 | 7/1995 | Morita ...................... 206/387.13 |
| 5,450,960 | 9/1995 | Katagiri et al. ............. 206/387.1 |

FOREIGN PATENT DOCUMENTS

| A20415083 | 3/1991 | European Pat. Off. . |
| A20494690 | 7/1992 | European Pat. Off. . |
| 9109068 | 11/1991 | Germany . |

*Primary Examiner*—David T. Fidei
*Attorney, Agent, or Firm*—Sughrue, Mion, Zinn, Macpeak & Seas

[57] ABSTRACT

A magnetic tape cassette-accommodating case having an index card which is deformed into a configuration optimally suited to an enlarged-thickness portion of a magnetic tape cassette. The index card has a slit formed in a vicinity facing a recessed portion of the cassette-accommodating case.

7 Claims, 6 Drawing Sheets

MAGNETIC TAPE CASSETTE-ACCOMMODATING CASE HAVING AN EASILY DEFORMABLE INDEX CARD

BACKGROUND OF THE INVENTION

1. Field of the Invention

The present invention relates to a magnetic tape cassette-accommodating case, and more particularly to a magnetic tape cassette-accommodating case which is provided with an index card provided between the magnetic tape cassette and the case.

2. Description of the Related Art

In general, a magnetic tape cassette (hereafter referred to as the cassette) used for audio equipment and the like, when stored, is accommodated in a magnetic tape cassette-accommodating case (hereafter referred to as the cassette-accommodating case) formed of a plastic or the like, so as to prevent the entry of dust and provide protection from physical damage.

Conventionally, a known cassette-accommodating case is arranged such that a cover 72 having a pocket 71 for a cassette 70 is openably supported by a main body 73 (Japanese Utility Model Application Laid-Open No. 3-45891), as shown in FIG. 9. The main body 73 and the cover 72 are respectively provided with wall portions 74 facing the obverse surface and the reverse surface of the cassette 70, and recessed portions 75 are respectively formed on the opening/closing distal end sides of the inner surfaces of the two wall portions 74.

With the cover 72 and the main body 73 closed, the recessed portions 75 respectively receive an enlarged-thickness portion 76 of the cassette 70 accommodated in the pocket 71. With the cover 72 closed, the interval between the wall portion 74 of the main body 73 and the wall portion 74 of the cover 72 is slightly larger than the thickness A of the cassette 70 other than the enlarged-thickness portion 76, and the interval between the two recessed portions 75 is slightly larger than the thickness B of the enlarged-thickness portion 76 of the cassette 70. In other words, the interval between the wall portions 74 is set by using the thickness A of the cassette 70 other than the enlarged-thickness portion 76 as a reference, and the cassette-accommodating case is thus formed as the so-called slim type in which the thickness of the case is set to a minimum.

As for such a cassette-accommodating case, a proposal has been made to use an index card 80 provided with an opening 81 at a position opposing the recessed portions 75. The index card 80 is positioned such that an end portion 82 bent in a U-shape in a side view is fitted in the pocket 71 of the cover 72 of the cassette-accommodating case, and a flat portion 83 folded in two extends along the wall portion 74 of the cover 72. The recessed portion 75 of the cover 72 is opposed to the recessed portion 75 of the main body 73 without being closed by virtue of the opening 81 of the index card 80, so as to receive the enlarged-thickness portion 76 of the cassette 70 being accommodated.

On the other hand, there are index cards which are formed without the opening 81. In one index card of this type, the flat portion 83 of the index card 80 has a size extending from the pocket 71 side to the inner edge side of the recessed portion 75. However, the index card of such an arrangement has a drawback in that the area for writing the details of recording information becomes small.

Further, as another arrangement of the index card in which the opening 81 is not formed, there is one in which the index card is subjected to embossing in correspondence with the configuration of the contour of the recessed portion 75 at a position facing the recessed portion 75, so as to be indented in conformity with the configuration of the enlarged-thickness portion 76 of the cassette. In such an arrangement as well, the recessed portion 75 is not closed flat by the index card, and its recess is made use of, thereby making it possible to effectively receive the enlarged-thickness portion 76.

It should be noted that, in the arrangement in which this embossing is provided, the fitting of the index card is allowed in a case where the recessed portion 75 is formed on the opposite side to the side in a cassette-accommodating case 100 shown in FIG. 9, i.e., on the pocket 71 side.

With the above-described conventional index cards, since the opening 81 or the embossed portion is provided, effective use of the function of the recessed portions of the cassette-accommodating case is made without being hampered. With the index card 80 having the opening 81, however, the opening 81 needs to be formed in advance in the flat portion 83 which is folded in two, for instance, so as to be registered with the recessed portion 75. Accordingly, there are cases where the positional correspondence between the opening 81 and the recessed portion 75 is offset, and, since the opening 81 is cut off, the area is bound to be too small by that portion or amount.

In addition, with the index card provided with embossing, embossing needs to be provided in advance at a position corresponding to the recessed portion. In other words, in this case, although the writing area is not reduced, there is a problem in that a relatively expensive facility for providing embossing is required, so that much labor and time are required for production, resulting in a higher cost. Furthermore, if the position of the embossing is offset, the fact that embossing is provided conversely impairs the function of the recessed portion 75, thereby undermining the stable accommodation of the magnetic tape cassette, so that high positional accuracy is required.

SUMMARY OF THE INVENTION

An object of the present invention is to provide a magnetic tape cassette-accommodating case which makes it possible to reduce the thickness thereof to a minimum by allowing the enlarged-thickness portion of the magnetic tape cassette to be received in its recess portions, and yet makes it possible to deform the index card to a configuration optimally suited to the enlarged-thickness portion of the magnetic tape cassette without cutting off a portion corresponding to the recessed portion or without requiring high forming accuracy, thereby making it possible to accommodate the magnetic tape cassette in a stable state.

The above object of the present invention is attained by a magnetic tape cassette-accommodating case in which a cover having an accommodating portion for accommodating a magnetic tape cassette is openably supported by a main body provided with rotation-preventing projections for preventing the rotation of reels of the magnetic tape cassette, recessed portions for receiving an enlarged-thickness portion of the magnetic tape cassette are respectively formed in the cover and the main body, and an index card is provided between the magnetic tape cassette and the cover, wherein the index card, provided on a side of the cover, has a slit formed in at least a portion of its area corresponding to the cover recessed portion or in a vicinity of that area.

The above object Of the present invention is attained by a magnetic tape cassette-accommodating case in which a cover having an accommodating portion for accommodating a magnetic tape cassette is openably supported by a main body provided with rotation-preventing projections for preventing the rotation of reels of the magnetic tape cassette, recessed portions for receiving an enlarged-thickness portion of the magnetic tape cassette are respectively formed in opening/closing proximal end sides of the cover and the main body, and an index card is provided between the magnetic tape cassette and the cover, wherein a pocket is provided in the cover on the opening/closing proximal end side thereof, wherein at least a portion of the index card has a bending portion bent in conformity to a configuration of inner surfaces of the pocket and is fitted in the pocket, and wherein slits extending from transverse sides of the index card are respectively formed at the bending portion and at a position substantially offset from an area opposing the cover recessed portion.

The above object of the present invention is attained by a magnetic tape cassette-accommodating case in which a cover having an accommodating portion for accommodating a magnetic tape cassette is openably supported by a main body provided with rotation-preventing projections for preventing the rotation of reels of the magnetic tape cassette, recessed portions for receiving an enlarged-thickness portion of the magnetic tape cassette are respectively formed in opening/closing proximal end sides of the cover and the main body, and an index card is provided between the magnetic tape cassette and the cover, wherein the index card, provided on a side of the cover, has at least one slit formed in its area substantially corresponding to the cover recessed portion, the slit extending along a direction substantially perpendicular to an inserting direction of the cassette.

The above object of the present invention is attained by a magnetic tape cassette-accommodating case in which a cover having an accommodating portion for accommodating a magnetic tape cassette is openably supported by a main body provided with rotation-preventing projections for preventing the rotation of reels of the magnetic tape cassette, recessed portions for receiving an enlarged-thickness portion of the magnetic tape cassette are respectively formed in opening/closing proximal end sides of the cover and the main body, and an index card is provided between the magnetic tape cassette and the cover, wherein the index card, provided on a side of the cover, has a slit formed on the opening/closing proximal end side in a portion substantially corresponding to the cover recessed portion, the slit extending along a direction substantially perpendicular to an inserting direction of the cassette and having a length substantially corresponding to a longitudinal length of the recessed cover portion.

The above object of the present invention is attained by a magnetic tape cassette-accommodating case in which a cover having an accommodating portion for accommodating a magnetic tape cassette is openably supported by a main body provided with rotation-preventing projections for preventing the rotation of reels of the magnetic tape cassette, recessed portions for receiving an enlarged-thickness portion of the magnetic tape cassette are respectively formed in opening/closing proximal end sides of the cover and the main body, and an index card is provided between the magnetic tape cassette and the cover, wherein the index card, provided on a side of the cover, has a slit formed at a position substantially corresponding to the cover recessed portion, the slit having a length substantially corresponding to that of that side of the cover recessed portion which is oriented along an inserting direction of the cassette.

DETAILED DESCRIPTION OF THE PREFERRED EMBODIMENTS

Hereafter, a detailed description will be given of the present invention with reference to the illustrated embodiments.

Figure 1:
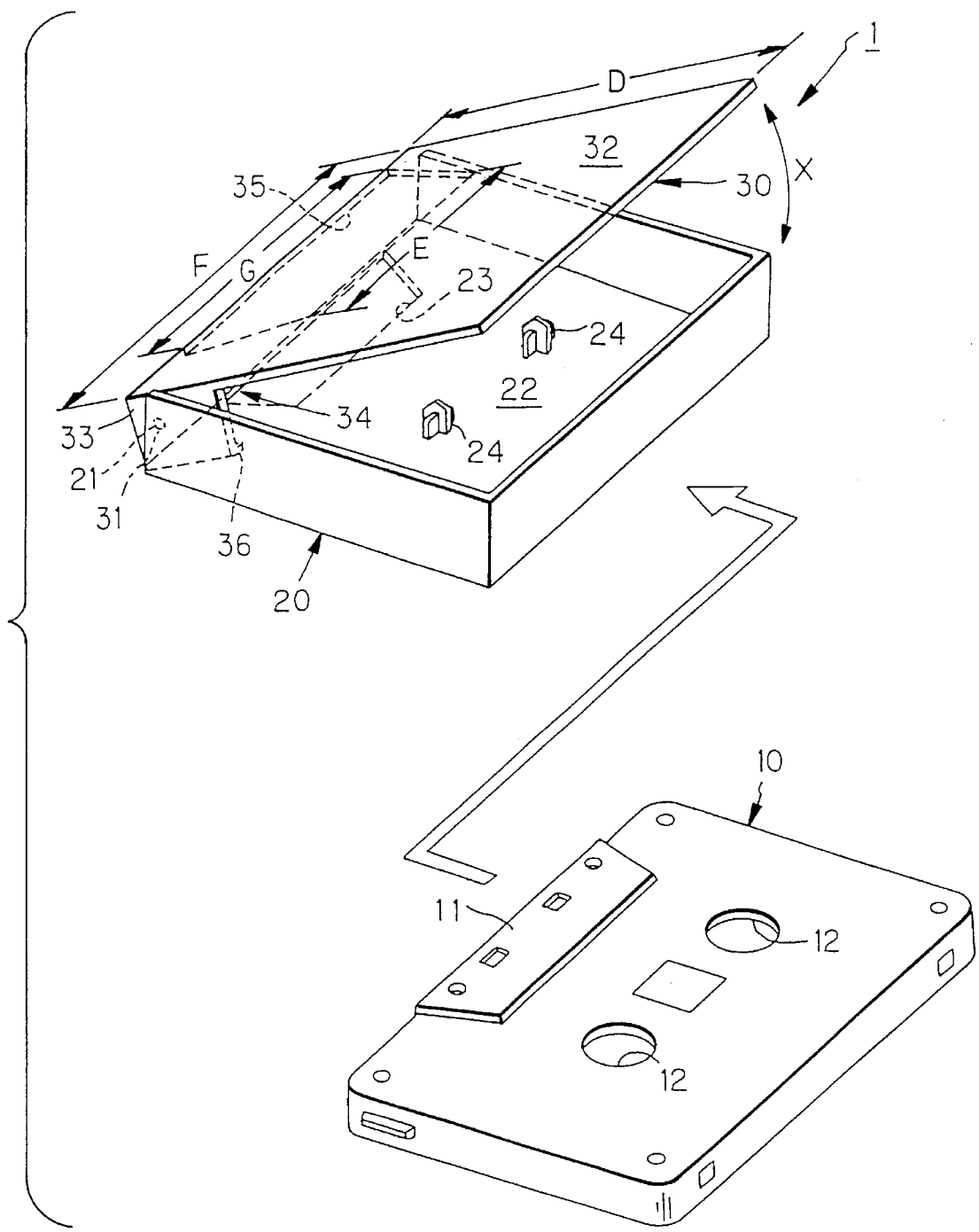
FIG. 1 is a perspective view illustrating a magnetic tape cassette-accommodating case in accordance with a first embodiment of the present invention and a magnetic tape cassette.

FIG. 1 is a perspective view illustrating a magnetic tape cassette-accommodating case 1 in accordance with a first embodiment of the present invention, and a magnetic tape cassette 10.

In FIG. 1, pins 21 provided in a main body 20 are respectively fitted in holes provided in a cover 30, so as to be relatively rotatable, so that the cover 30 is supported by the main body 20 in such a manner as to be opened or closed along the direction of arrow X. In addition, an index card 40 (FIG. 2) is provided in the cover 30.

The main body 20 has a wall portion 22 facing the obverse surface or reverse surface of the magnetic tape cassette 10, and a recessed portion 23 is provided on the inner surface of the wall portion 22 on the opening/closing proximal end side thereof. The recessed portion 23 is formed in a trapezoidal shape whose long side is the opening/closing proximal end side, in conformity to the configuration of an enlarged-thickness portion 11 of the cassette 10. In addition, a pair of rotation-preventing projections 24 are provided with a predetermined interval therebetween in the vicinities of the center of the wall portion 22. The rotation-preventing projections 24 are respectively fitted in reel-shaft inserting holes 12 of the cassette 10 which is accommodated, so as to prevent the unnecessary rotation of reels (not shown) around which the magnetic tape (not shown) is wound.

The cover 30 has a wall portion 32 which faces the wall portion 22 of the main body 20 in the closed state, and a side wall portion 33 is provided at each end of the opening/closing proximal end side of the wall portion 32 in such a manner as to project perpendicularly to the wall portion 32.

A guide pawl 36 is provided projectingly on each of the side wall portions 33 in parallel with the wall portion 32, and constitutes a part of a pocket 34 (a pocket formed by virtually four side walls and devoid of a wall portion facing the wall portion 32) in which the cassette 10 is accommodated such that a portion of the cassette 10 is inserted therein. The cassette 10 is accommodated into the pocket 34 in such a manner as to be inserted with the enlarged-thickness portion 11 side thereof facing the pocket 34.

A cover recessed portion 35 is provided on the inner surface of the wall portion 32 on the opening/closing proximal end side thereof at a position facing the recessed portion 23 of the main body 20. In the same way as the recessed portion 23 of the main body 20, the cover recessed portion 35 is formed in a trapezoidal shape whose long side is the opening/closing proximal end side, in conformity to the configuration of the enlarged-thickness portion 11 of the cassette 10. With the cover 30 closed, the cover recessed portion 35 forms a required space between the same and the recessed portion 23 of the main body 20, so as to receive the enlarged-thickness portion 11 of the cassette 10.

Figure 2:
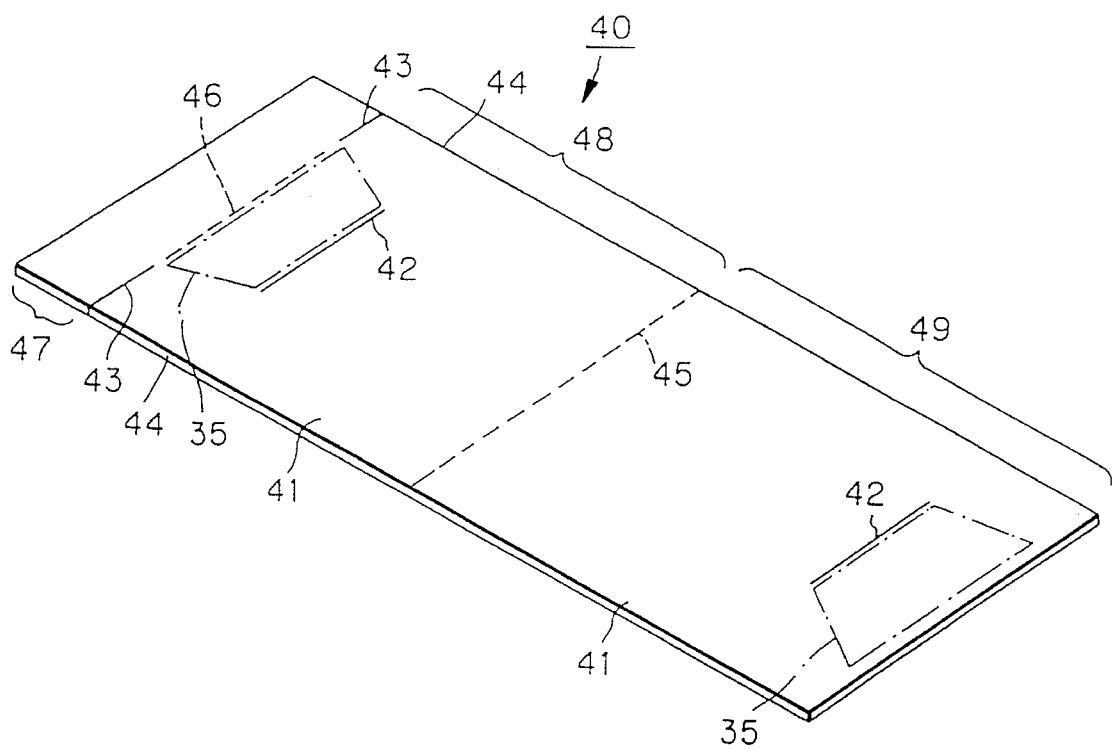
FIG. 2 is a perspective view illustrating a state in which an index card for the magnetic tape cassette-accommodating case shown in FIG. 1 is developed.
Figure 3:
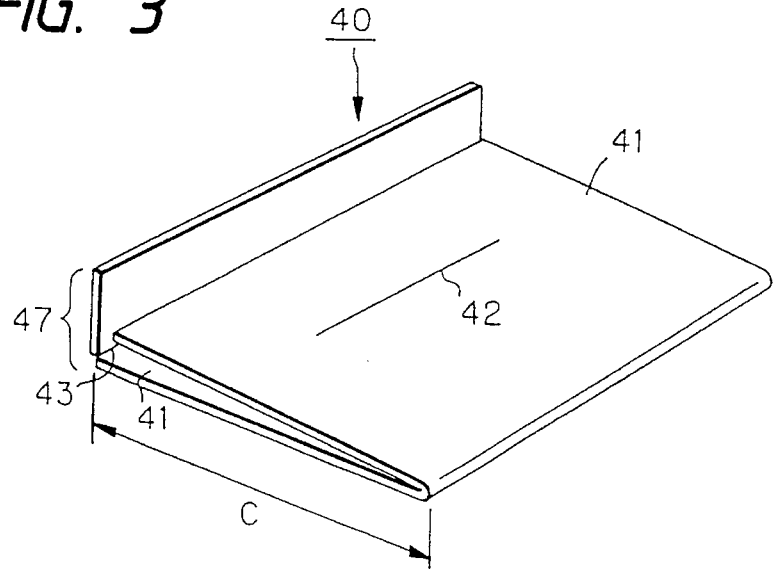
FIG. 3 is a perspective view illustrating a state in which the index card shown in FIG. 2 is assembled.

As shown in FIGS. 2 and 3, the index card 40 is formed such that cardboard or the like cut into a rectangular shape is folded at a folding portion 45, shown by the broken line in its substantially central area, by approximately 180° in two with its inner surfaces (upper surface in FIG. 2) facing each other, and is bent perpendicularly by approximately 90° at a bending portion 46 shown by the broken line in an end area, thereby forming a substantially L-shape in a side view. As for the index card 40, information on the cassette 10 to be accommodated can be written also on a portion corresponding to the recessed portion 35.

With reference to FIGS. 1 to 3, flat portions 41 are constituted by two wide flat areas 48, 49 of the index card 40 which is folded in two. The depth C (FIG. 3) of the flat portion 41 of the wide flat area 48 and that of the wide flat area 49 are formed to be substantially the same, and are set slightly smaller than the dimension D (FIG. 1) of the wall portion 32 of the cover 30.

A narrow area 47 of the index card 40, which is at the distal end side from the bent portion shown by the broken line 46, is fitted in the pocket 34 (FIG. 1) in such a manner as to be aligned with the opening/closing proximal end side of the inner surface of the wall portion 32 (FIG. 1) of the cover 30. The flat portions 41 are positioned in such a manner as to extend along the wall portion 32.

It should be noted that, as the index card 40, a material such as paper or a plastic sheet, which does not produce dust, is preferable, and it is possible to use a material which is provided with an antistatic finish.

A slit 42 is formed in each flat portion 41 of the index card 40 at a position extending along the short side of the trapezoid of the recessed portion 35 in an area opposing the recessed portion 35 (corresponding to the position shown by the phantom line in FIG. 2). The slit 42 is one which is cut in the index card 40, and has a length which is substantially identical to the length E (see FIG. 1) of the short side of the trapezoid of the recessed portion 35. In addition, at opposite ends of the bending portion 46 which defines the narrow area 47 of the index card 40, slits 43 extending from transverse sides 44 of the card are respectively formed at a position substantially offset from the area opposing the recessed portion 35.

Each of the slits 43 is one which is cut in the index card 40, and the length of each slit 43 is equivalent to one half of the length in which the length G (see FIG. 1) of the long side of the trapezoid of the recessed portion 35 is subtracted from the length F (see FIG. 1) of the opening/closing proximal end of the cover 30.

When the index card 40 has undergone the stage of fabrication such as cutting out, these slits 42 and 43 are in a state in which slits are merely formed. However, in the process in which the index card 40 is used, the index card 40 comes to be deformed into an optimum shape in conformity to the configuration of the enlarged-thickness portion 11 of the cassette 10 accommodated in the case. Namely, if the slits 42, 43 are formed at a position generally corresponding to the recessed portion 35, the index card 40 is liable to be deformed when a pressing force is applied thereto by the enlarged-thickness portion 11, and a recess is formed in the index card 40 at an appropriate position corresponding to the recessed portion 35. If this recess is formed, the cassette 10 is accommodated in the cassette-accommodating case 1 in a stable state.

The function of the index card 40 whereby the index card 40 is liable to be deformed in conformity to the recessed portion 35 can be demonstrated by either one of the arrangements of the slits 42 and the slits 43. In particular, in the arrangement in which the slits 43 are formed, the substantial improvement in rigidity due to the narrow area 47 being bent by approximately 90° with respect to the wide area 48 is avoided. That is, as compared with the case where the slits 43 are not provided, it is possible to avoid a situation in which the flat portions 41 cover the recessed portion 35 without caving into the recessed portion, thereby making it possible to demonstrate the function whereby the flat portions 41 are liable to cave into the recessed portion 35.

Incidentally, although each of the slits 42 is formed into a configuration extending along the short side of the trapezoid of the recessed portion 35, in the present invention, each of the slits 42 may be arranged to extend along the long side of the trapezoid. Furthermore, an arrangement may be provided such that two slits are provided in such a manner as to extend along the short and long sides of the trapezoid, respectively.

Figure 4:
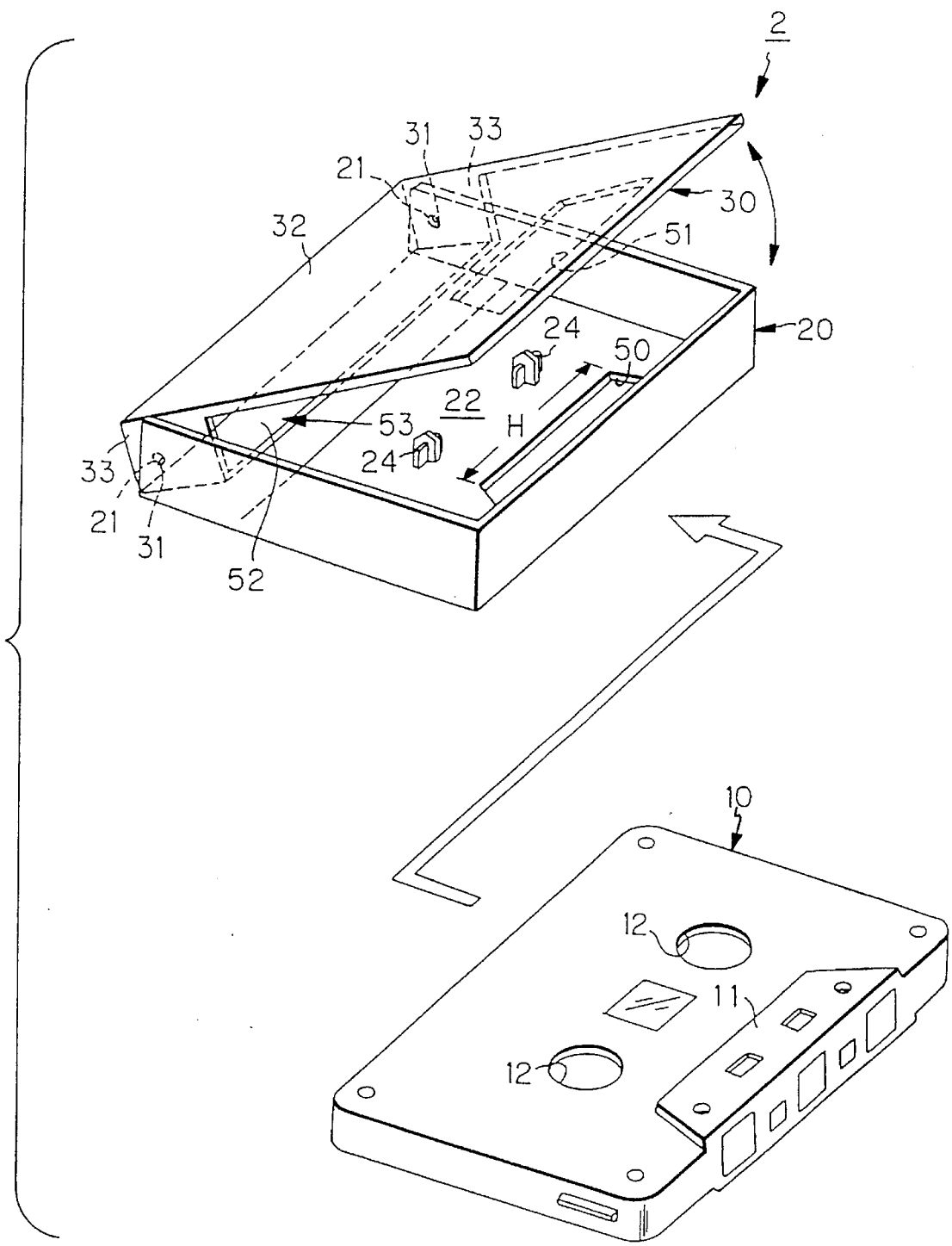
FIG. 4 is a perspective view illustrating a magnetic tape cassette-accommodating case in accordance with a second embodiment of the present invention and the magnetic tape cassette.

FIG. 4 is a perspective view illustrating a magnetic tape cassette-accommodating case 2 in accordance with a second embodiment of the present invention and the magnetic tape cassette 10.

In FIG. 4, a recessed portion 50 of the main body 20 of the cassette-accommodating case 2 is provided on the opening/closing distal end side of the inner surface of the wall portion 22. The recessed portion 50 is formed into a trapezoidal shape whose long side is the opening/closing distal end side, in conformity with the configuration of the enlarged-thickness portion 11 of the cassette 10. In addition, a cover recessed portion 51 of the cover 30 is provided on the opening/closing distal end side of the inner surface of the wall portion 32, in face-to-face relation to the recessed portion 50 of the main body 20. A guide wall 52 is provided between the side wall portions 33 in parallel with the wall portion 32, with the result that a pocket 53 having five side walls for securely holding the cassette 10 is formed. The cassette 10 is accommodated into the pocket 53 in such a manner as to be inserted with the side opposite to the enlarged-thickness portion 11 facing the pocket 53.

Figure 5:
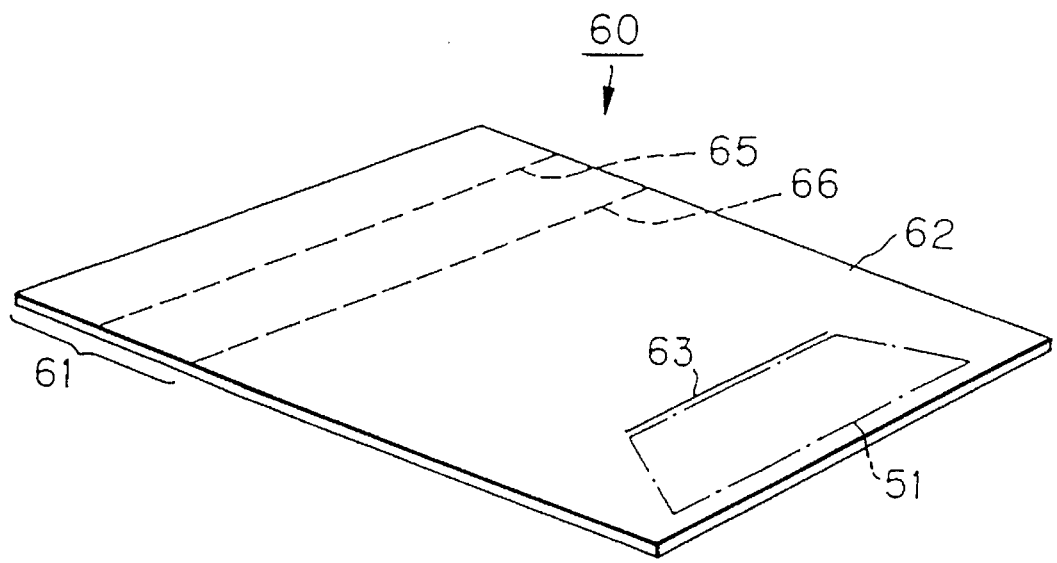
FIG. 5 is a perspective view illustrating a state in which the index card for the magnetic tape cassette-accommodating case shown in FIG. 4 is developed.
Figure 6:
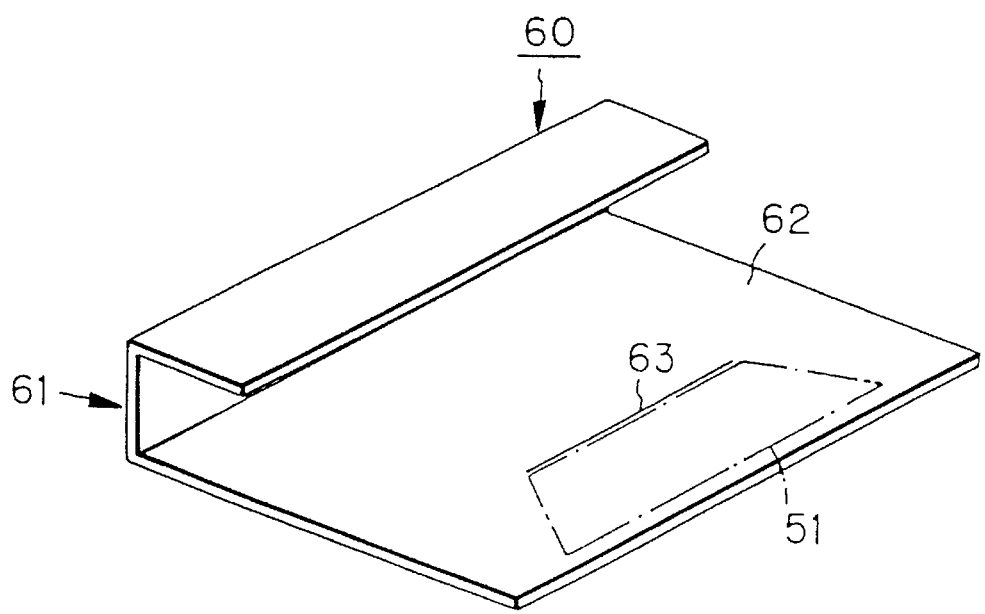
FIG. 6 is a perspective view illustrating a state in which the index card shown in FIG. 5 is folded.

As shown in FIGS. 5 and 6, the index card 60 is formed substantially into a U-shape such that, for example, cardboard or the like cut into a rectangular shape, as shown in FIG. 6, is bent by approximately 90° at bending portions 65 and 66, respectively, which are indicated by the broken lines, so as to form a narrow area 61 for corresponding to the innermost surfaces of the pocket. As for the index card 60, this U-shaped narrow area 61 is fitted into the pocket 53 (see FIG. 4) of the cover 30, and a flat portion 62 is positioned in such a manner as to extend along the wall portion 32 (see FIG. 4).

The slit 63 is formed on the opening/closing proximal end side of the area of the flat portion 62 opposing the recessed portion 51 and at a position extending along the short side of the trapezoid of the recessed portion 51. The slit 63 should desirably have a length substantially identical to the length H (see FIG. 4) of the short side of the trapezoid of each of the recessed portions 50, 51.

In the case of this embodiment, when the cassette 10 is accommodated into the pocket 53 of the cover 30 with the rear portion of the cassette 10 (the side opposite to the enlarged-thickness portion 11) facing the pocket 53, the index card 60 already accommodated in the pocket is provided with a recess of a configuration optimally suited to the enlarged-thickness portion 11 of the cassette 10 by virtue of the slit 63 which is formed on the opening/closing distal end side of the area facing the recessed portion 51 and at the position extending along the short side of the trapezoid of the recessed portion 51. Consequently, the cassette 10 is accommodated in a stable state. In addition, since the slit 63 is positioned on the opening/closing proximal end side (pivotally secured side) of the recessed portion 51, an edge of the cassette is not caught by the slit 63 during the cassette removing operation.

Figure 7:
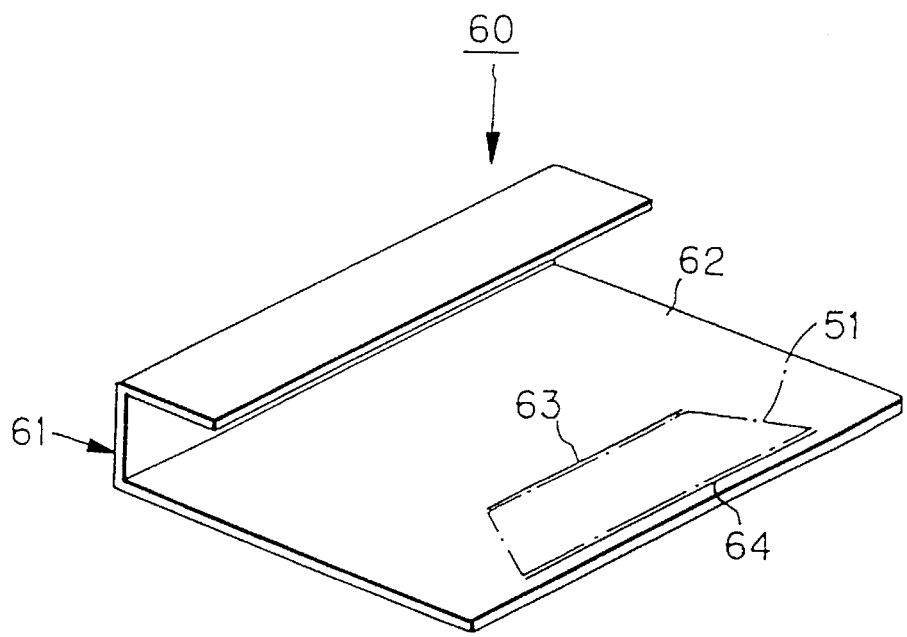
FIG. 7 is a perspective view of the index case in accordance with another embodiment of the present invention.
Figure 8:
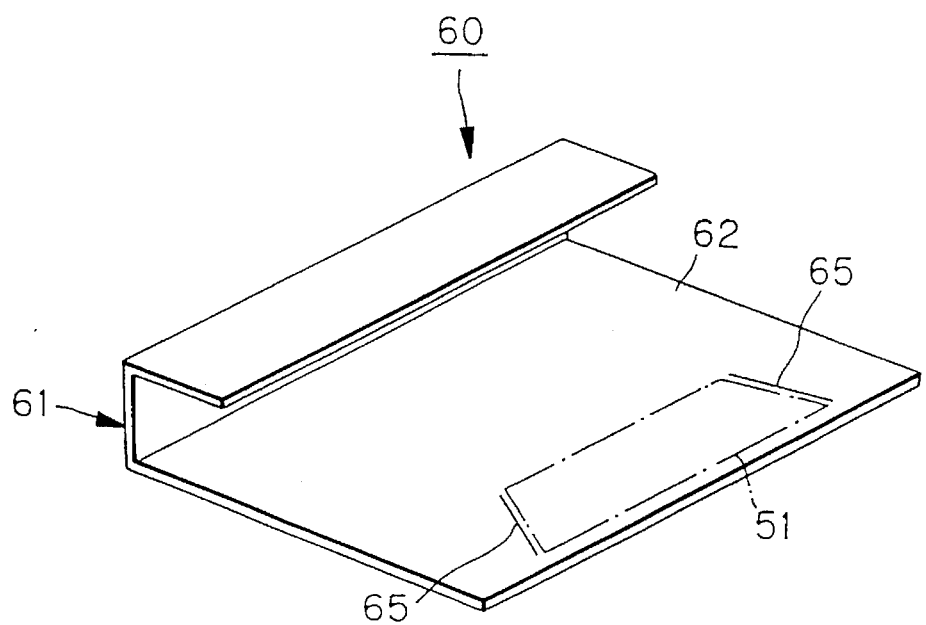
FIG. 8 is a perspective view of the index case in accordance with still another embodiment of the present invention.
Figure 9:
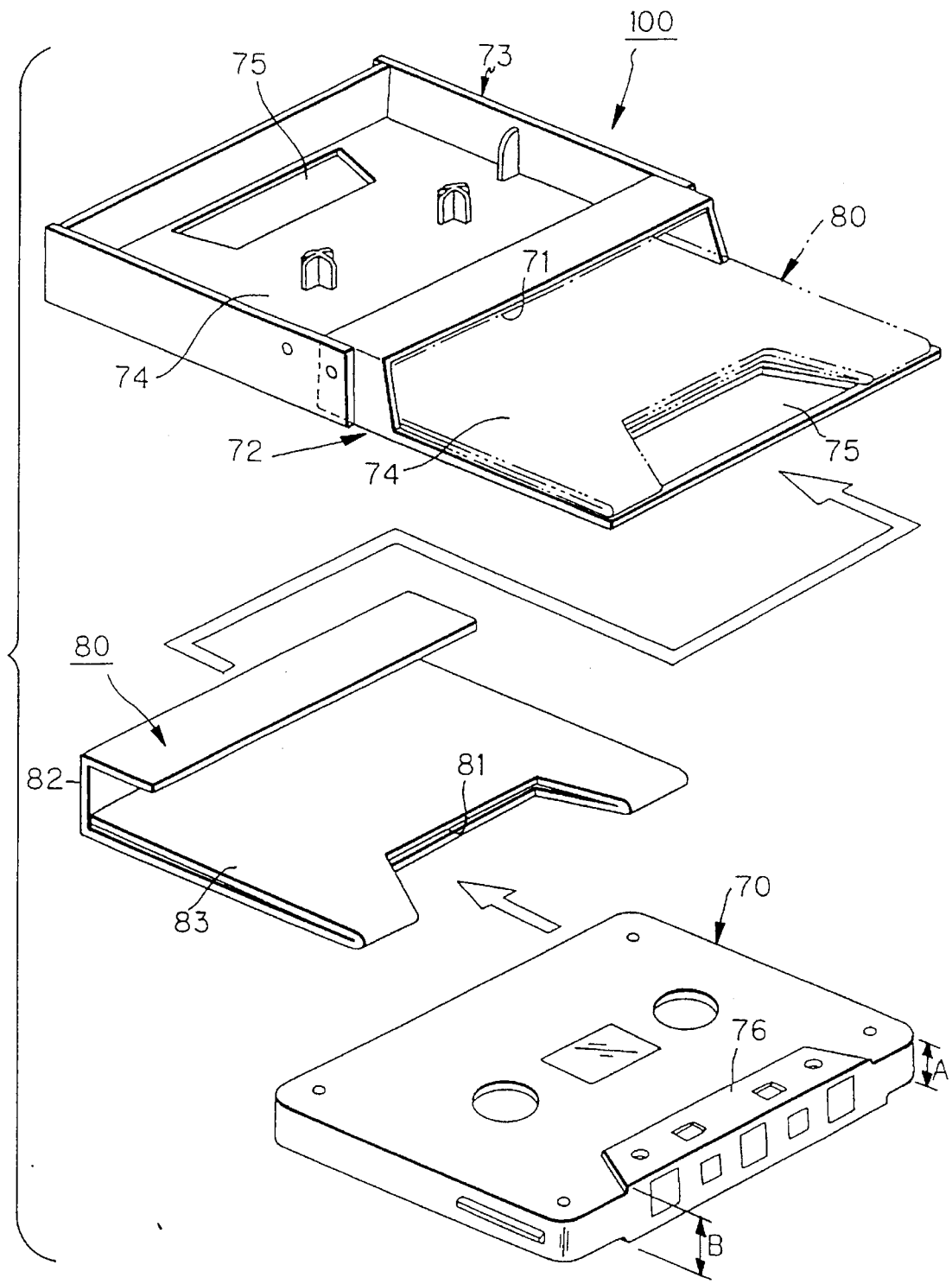
FIG. 9 is a perspective view illustrating a conventional magnetic tape cassette-accommodating case and the magnetic tape cassette.

The present invention may also be arranged as shown in FIGS. 7 and 8.

The arrangement of the index card 60 shown in FIG. 7 is one in which a slit 64 is added to the index card 60 of the arrangement shown in FIG. 6. Namely, two slits are formed in such a manner as to extend along both the short side portion and the long side portion of the recessed portion 51, and this structure further facilitates the deformation of the flat portion 62.

The arrangement of the index card 60 shown in FIG. 8 is one in which slits 65 are respectively formed at portions corresponding to longitudinal opposite sides of the recessed portion 51. Namely, these slits are oriented along the inserting direction of the cassette, and, in this structure as well, the deformation of the flat portion 62 is further facilitated. In addition, it is possible to effectively avoid the situation in which the cassette is caught by the slit during the cassette removing operation.

In each of the above-described embodiments, in a case where, in the production process, the index cards 40, 60 superposed one on top of another are lifted and transported one by one as the flat portion is sucked by means of a sucker or the like, since air is released through the slits 42, 43, 63, 64, 65 the instant the index card is lifted up, each index card can be separated easily without a plurality of index cards being transported in a superposed state by unnecessary suction, thereby making it possible to ensure excellent transportability.

It should be noted that although, in the above-described embodiments, the slits are arranged to be large slits cut in the index cards 40, 60, in the present invention, it is possible to provide broken-line slits (perforations) which are relatively easily torn off.

As described above, in accordance with the present invention, since the index card provided in the cover has a slit formed in at least a portion of its area corresponding to the recessed portion or in the vicinity of that area, although it is possible to reduce the thickness of the accommodating case to a minimum by allowing the enlarged-thickness portion of the magnetic tape cassette to be received in its recess portions, it is possible to deform the index card to a configuration optimally suited to the enlarged-thickness portion of the magnetic tape cassette, thereby making it possible to accommodate the magnetic tape cassette in a stable state.

In addition, since it is unnecessary to provide the arrangement in which a portion corresponding to the recessed portion is cut out as in the conventional slim-type index card, it is possible to enlarge the area of the index card.

Furthermore, in accordance with the present invention, not much accuracy is required as to the position where the slits are formed, and even at a relatively roughly formed position it is possible to enhance the deformability of the index card in correspondence with the recessed portion. Accordingly, it is possible to provide a magnetic tape cassette-accommodating case which is provided with a functionally excellent index card which has a large area and in which a recess accurately corresponding to the recessed portion can be formed, while suppressing the increased cost of the production facility.

It is contemplated that numerous modifications may be made to the cassette-accommodating case of the present invention without departing from the spirit and scope of the invention as defined in the following claims.

What is claimed is:

1. A magnetic tape cassette-accommodating case in which a cover having an accommodating portion for accommodating a magnetic tape cassette is openably supported by a main body provided with rotation-preventing projections for preventing the rotation of reels of said magnetic tape cassette, recessed portions for receiving an enlarged-thickness portion of said magnetic tape cassette are respectively formed in said cover and said main body, and an index card is provided between said magnetic tape cassette and said cover, wherein said index card, provided on a side of said cover, has a slit formed in at least a portion of an area corresponding to one of said recessed portion formed in said cover and in a vicinity of that area.

2. The magnetic tape cassette-accommodating case as claimed in claim 1, wherein said recessed portions are respectively formed in opening/closing proximal end sides of said cover and said main body where said cover is supported by said main body.

3. The magnetic tape cassette-accommodating case as claimed in claim 1, wherein said recessed portions are respectively formed in opening/closing distal end sides of said cover and said main body which are opposite to sides where said cover is supported by said main body.

4. A magnetic tape cassette-accommodating case in which a cover having an accommodating portion for accommodating a magnetic tape cassette is openably supported by a main body provided with rotation-preventing projections for preventing the rotation of reels of said magnetic tape cassette, recessed portions for receiving an enlarged-thickness portion of said magnetic tape cassette are respectively formed in opening/closing proximal end sides of said cover and said main body, and an index card is provided between said magnetic tape cassette and said cover, wherein a pocket is provided in said cover on the opening/closing proximal end side thereof, wherein at least a portion of said index card has a bending portion bent in conformity to a configuration of inner surfaces of said pocket and is fitted in said pocket, and wherein a slit extending from transverse sides of said index card is formed at the bending portion.

5. A magnetic tape cassette-accommodating case in which a cover having an accommodating portion for accommodating a magnetic tape cassette is openably supported by a main body provided with rotation-preventing projections for preventing the rotation of reels of said magnetic tape cassette, recessed portions for receiving an enlarged-thickness portion of said magnetic tape cassette are respectively formed in opening/closing proximal end sides of said cover and said main body, and an index card is provided between said magnetic tape cassette and said cover, wherein said index card, provided on a side of said cover, has at least one slit formed in an area substantially corresponding to said recessed portion formed in said cover where said cover is supported by said main body, said at least one slit extending along a direction substantially perpendicular to an inserting direction of said cassette.

6. A magnetic tape cassette-accommodating case in which a cover having an accommodating portion for accommodating a magnetic tape cassette is openably supported by a main body provided with rotation-preventing projections for preventing the rotation of reels of said magnetic tape cassette, recessed portions for receiving an enlarged-thickness portion of said magnetic tape cassette are respectively formed in opening/closing proximal end sides of said cover and said main body, and an index card is provided between said magnetic tape cassette and said cover, wherein said index card, provided on a side of said cover, has a slit formed on the opening/closing proximal end side where said cover is supported by said main body, in a portion substantially corresponding to a lower edge of said recessed portion formed in said cover, said slit extending along a direction substantially perpendicular to an inserting direction of said cassette and having a length substantially corresponding to a longitudinal length of said recessed portion formed in said cover.

7. A magnetic tape cassette-accommodating case in which a cover having an accommodating portion for accommodating a magnetic tape cassette is openably supported by a main body provided with rotation-preventing projections for preventing the rotation of reels of said magnetic tape cassette, recessed portions for receiving an enlarged-thickness portion of said magnetic tape cassette are respectively formed in opening/closing proximal end sides of said cover and said main body, and an index card is provided between said magnetic tape cassette and said cover, wherein said index card, provided on a side of said cover, has a slit formed at a position substantially corresponding to said recessed portion formed in said cover where said cover is supported by said main body, said slit having a length substantially corresponding to a length of a side of said recessed portion formed in said cover and which is oriented along an inserting direction of said magnetic tape cassette.

* * * * *